Jan. 13, 1931.  L. R. SMITH  1,788,473
LOCKING MECHANISM FOR VEHICLE FUEL TANKS
Filed March 6, 1929
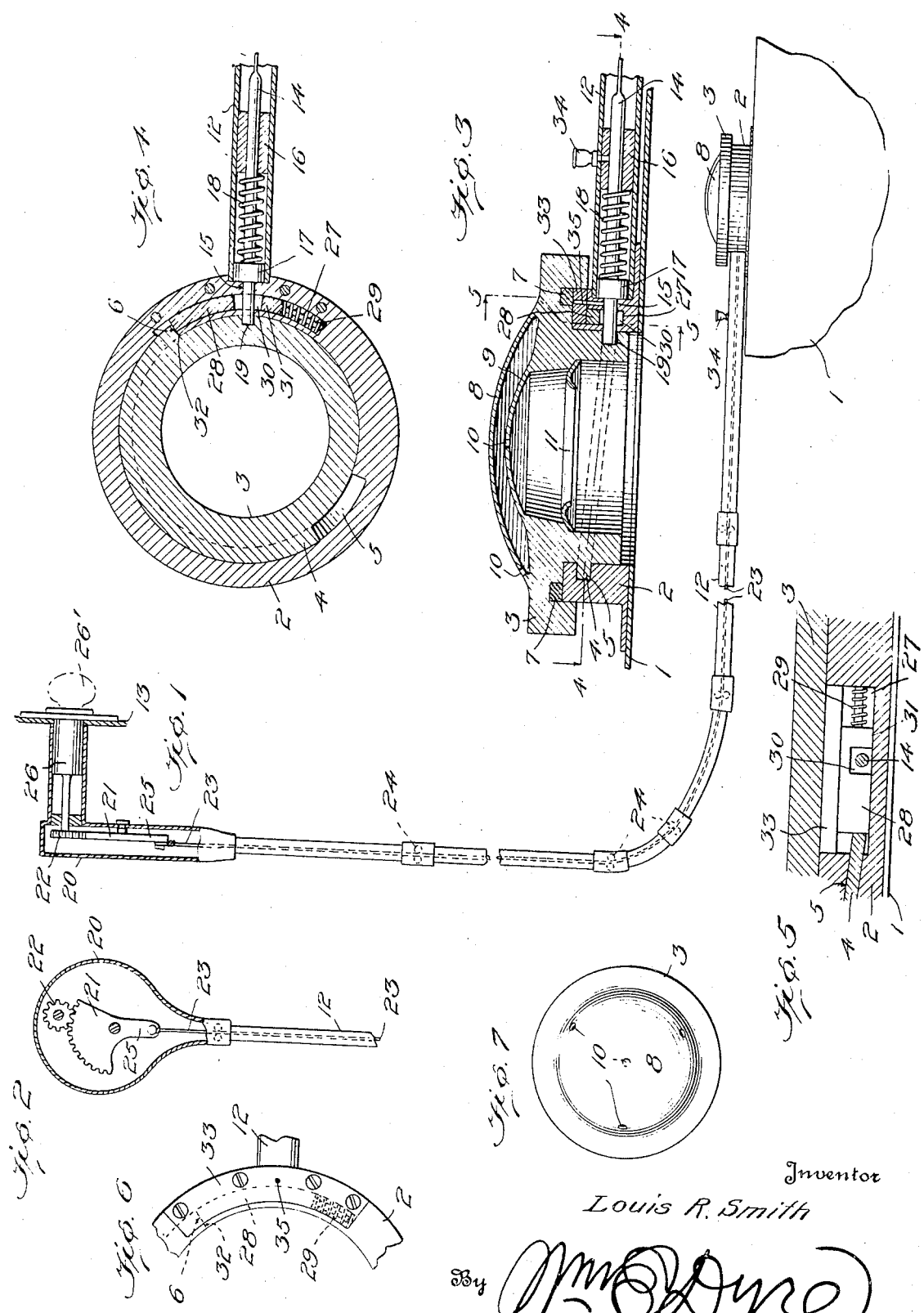
Inventor
Louis R. Smith
By Wm O Dyre
his Attorney Patented Jan. 13, 1931

1,788,473

UNITED STATES PATENT OFFICE

LOUIS R. SMITH, OF KEKAHA, TERRITORY OF HAWAII

LOCKING MECHANISM FOR VEHICLE FUEL TANKS

Application filed March 6, 1929. Serial No. 344,769.

My invention relates to closures for the fuel tanks of motor vehicles, and has for an object the provision of a cap for such tanks presenting the appearance of those heretofore used but provided with positive locking mechanism to prevent removal by unauthorized persons.

A further object is to provide a cap which may be locked in place by simply screwing it down upon the cap base, but which is provided with unlocking means of the remote-control type conveniently placed on the instrument board of the vehicle, or elsewhere, whereby it will be possible for the operator of a machine equipped with my invention, without moving from the driver's seat to unlock the cap to permit of its removal for the introduction of fuel into the tank.

Another object is to provide a locking cap of the character indicated comprising a cap base equipped with a sliding bolt adapted to enter a perforation in the cap when the operator turns a key in a keyhole on the instrument board, but so constructed that the bolt cannot be shot unless the cap is in place and tightly screwed down on its base. In this way accidental driving off from a filling station without the tank cap is prevented.

An additional object is the provision of a locking cap and appurtenant mechanism the elements of which, when in their normal closed and locked position, exhibit no exposed or accessible screw heads or other means by which the parts may be disconnected.

It is another object of my invention to provide a key to actuate the tank closure lock which is identical with the ignition key of the vehicle and which cannot be withdrawn from the closure operating lock except when the bolt is in its locking position. As ignition keys generally cannot be withdrawn from the ignition lock except when the ignition switch is in the "off" position, it will be apparent that the engine of a car equipped with my invention must be shut off before the cap can be removed to take on gasoline, and conversely, the ignition key of such a car is not available for starting the engine until the cap has been locked in place on the fuel tank. The convenience and safety of such an arrangement are obvious.

A still further object is the provision of a combination of parts in a mechanism of this type which shall be simple and efficient in design and operation, economical to manufacture, as also easily and quickly assembled.

Other objects and advantages will sufficiently appear from the detailed description hereinafter and will be readily apparent to those familiar with the art to which this invention relates.

In the drawings forming part of this application for Letters Patent, in which like reference characters indicate the same parts in the several views, Figure 1 is a side view showing the lock operating mechanism in section and the tank, cap and connecting conduit in elevation;

Fig. 2 is a front view of a part of the lock operating mechanism;

Fig. 3 is a vertical section of the cap, cap base and bolt;

Fig. 4 is a top plan view of the parts shown in Fig. 3;

Fig. 5 is a vertical section through the cap and base, taken on the line 5—5 of Fig. 3;

Fig. 6 is a top plan view of one part of the cap base; and

Fig. 7 is a top plan view of the cap.

Referring to the drawings, 1 designates a gasoline tank of common construction usually mounted at the rear of the body of a motor vehicle. The tank is provided with the ordinary circular opening in its upper surface for the introduction of gasoline, about which it has brazed, riveted or otherwise permanently secured, a cap base 2 upon which the cap 3 is adapted to be screwed down by engagement of the spiral projection 4 on the cap with the complementary groove 5 in the cap base. This projection constitutes a coarse, short screw thread terminating abruptly in a squared shoulder 6 for a purpose hereinafter explained, and is commonly disposed about 180° around the cap. The groove is of approximately the same length so that the cap is screwed home on the base by giving it only a half-turn, and the groove may be conveniently formed slightly shallower at its lower end than the width of the lower end of the projection so that when the cap is fully screwed down on the base these two parts will be in binding relation and the cap thereby held securely against accidently working loose.

In order to make the connection between cap and base gas-tight, I provide a ring of suitable hydraulic packing 7 in an annular channel in the cap so that the same will bear down tightly upon the upper face of the base when the cap is fully screwed down. The cap is conveniently provided with a top 8 and a false top 9, and both tops have unregistering pinholes 10 which serve to vent the tank by admitting air to displace the gasoline consumed by the engine. A downwardly curving annular ledge 11 is set in the inside of the cap surrounding the opening in the tank for the purpose of deflecting and breaking the force of splashing gasoline and preventing loss of the same through the pinholes 9.

It should be understood that the specific type of closure structure thus far described is not essential to the practice of my present invention except in so far as it consists of a base member and a cap adapted to fit down upon the same.

Communicating with and securely fixed in radial relation to the base is one end of a tubular conduit 12, the other end of which rises behind the instrument board 13, as shown in Fig. 1. This conduit is preferably formed of hardened steel, and contains, at its cap base end, the cylindrical bolt 14, the end of which, when fully shot, extends through and slightly beyond a perforation 15 in the cap base. The bolt is maintained in axial relation with the conduit by the bearing 16 through which it may reciprocate, and the sliding guide 17 which is secured fast upon the bolt. Between these two guide elements is disposed a coil spring 18, which by its compression normally urges the bolt forward, that is, toward the cap.

The vertical wall of the cap 3 which fits inside the base is provided with a socket 19 so positioned as to register with the perforation 15 in the base when the cap is screwed home thereon. It will be apparent that the arrangement thus far described permits the bolt 14 to act as a locking and unlocking means for the cap 3 and the base 2 when the former is screwed down tightly upon the latter. As it is an object of my invention to provide means for permitting the driver of the vehicle to actuate the bolt without moving from his seat, I have devised mechanism for this purpose as follows:

As has been stated heretofore, the tubular conduit 12 is carried forward of the vehicle to terminate behind the instrument board thereof in a flat housing 20 which is circular or pear-shaped in section, as shown to advantage in Fig. 2. This housing has pivoted at about its center a toothed segment 21 meshing with a spur pinion 22 also journalled in the housing. A cable 23, which may be guided in the conduit by rollers 24, connects an arm 25 of the segment with the bolt 14. It will be apparent that rotation of the pinion 22, in a counter-clockwise direction as viewed in Fig. 2, will operate to withdraw the bolt 14 from the cap socket 19 and permit the latter to be unscrewed and removed from the base. An ordinary barrel lock 26, mounted behind the instrument board 13 and actuated by a key 26', may serve to effect this rotation of the pinion 22.

It is, however, an object of my present invention to provide means for preventing the bolt being shot under the influence of the spring 18 when the cap 3 is not screwed down tightly upon the base 2. For this purpose the cap base is recessed circumferentially, as at 27, in its upper face, this recess extending for some little distance in each direction from the bolt-receiving perforation 15 and terminating in one direction at the end of the base groove 5. A notched bar 28 shorter than the recess and necessarily arcuate in plan, as best shown in Fig. 4, is contained in the recess, as is also a coiled compression spring 29 which normally urges the bar toward the end of the groove 5. The bar 28 is so formed that when moved against the spring 29 by reason of the squared end 6 of the projection 4 entering the recess 27, the notch 30 will register with the bolt-receiving perforation 13 and the socket 19, so that the bolt 14, moving under the influence of the spring 18, may enter the socket 19 and lock cap and base together. When, however, the bolt is withdrawn and the cap unscrewed, the bar 28 moves to the end of the recess and its imperforate portion 31 obstructs the passage of the bolt through the perforation 15. In this position of the parts the key 26' cannot be turned in its locking direction, and the driver of the vehicle is apprised by this fact that the cap is not screwed down tightly in place on its base.

As has been suggested hereinbefore, the key 26' is preferably one which fits also the ignition lock of the vehicle (not shown) and which cannot be removed from the ignition lock while the engine is running. The tank cap lock 26 is in this case so constructed that the key cannot be withdrawn therefrom except when the bolt 14 is fully shot to its locking position. This arrangement obviously necessitates cutting off the engine before taking on gasoline, and locking the tank cap in place before again starting the engine to drive off from the filling station. By these means, therefore, the regulations obtaining in most localities that no fuel be taken on while the engine is running are necessarily complied with, and in addition it is rendered impossible for the driver of the vehicle to drive off from a filling station and unconsciously leave the gasoline tank cap behind.

In order to positively limit the travel of bar 28 to a position where the notch 30 will register with perforation 15 and socket 19, the inner wall of the base 2 bounding the recess 27 is cut back slightly to provide a stop 32 for the incoming shoulder 6 of the projection 4, and this cut-back portion should of course be of a depth just sufficient to allow the notch 30 to uncover the bolt 14 simultaneously with the registering of perforation 15 and socket 19 and the tight screwing down of the cap upon the base.

The parts contained in the recess 27 are retained in place by a cover plate 33 screwed down upon the upper face of the base, as appears to advantage in Fig. 6, so that when the cap is on the base there is no exposed means of dismantling these parts and the locked cap is proof against tampering.

Proper lubrication of the reciprocating bolt may be afforded by a suitable grease cup or the like 34 and an oil hole 35. All exposed parts such as the cap, base and conduit are preferably formed of case-hardened steel or similar resistant material as is usual in locking devices generally.

It is to be understood that I have illustrated and described one preferred form of my present invention. Modifications of structure embodying the principle of my invention will readily suggest themselves to persons skilled in the art and are therefore to be considered within the scope and spirit of the claims hereto appended.

What I claim and desire to secure by Letters Patent is:

1. A closure for the fuel tank of a vehicle comprising a cap, a base therefor, a bolt for locking the cap and base together when said elements are in fully closed relation, and means for preventing movement of the bolt in its locking direction when the cap and base are not in fully closed relation.

2. A closure for the fuel tank of a vehicle comprising a cap, a base therefor, means for automatically locking the cap and base together when said elements are in fully closed relation, and means actuated by the cap for rendering said locking means inoperative when the cap and base are not in fully closed relation.

3. A closure for the fuel tank of a vehicle comprising a cap, a base therefor, spring actuated means for automatically locking the cap and base together when said elements are in fully closed relation, a member for rendering said locking means inoperative when the cap and base are not in fully closed relation, and means associated with the cap for displacing said member when the cap and base are brought to fully closed relation.

4. A closure for the fuel tank of a vehicle comprising a cap carrying a screw thread, a base therefor provided with a groove engageable with the thread, a bolt for locking the cap and base together when said elements are in fully engaged relation, and a member for preventing movement of said bolt to its locking position when the cap and base are not in fully closed relation, a portion of said thread being adapted to displace said member and permit movement of said bolt to its locking position when the cap and base are in fully closed relation.

5. A closure for the fuel tank of a vehicle comprising a base provided with a spiral groove, a cap having a complementary thread engageable with the groove, openings in the cap and base, a bolt adapted to pass through said openings to lock cap and base together, a slidable bar associated with the base and engageable with the thread to prevent penetration of the bolt into the cap opening when the cap is not fully screwed down on the base.

6. In a closure for a tank, a base and a cap engageable therewith, a bolt carried by the base and adapted to engage the cap, a bar interposed between a portion of the base and the cap normally preventing engagement of the bolt with the cap, and means carried by the cap to displace the bar and permit engagement of the bolt with the cap when the cap is fully engaged with the base.

7. In a closure for a tank, a base and a cap engageable therewith, a bolt carried by the base and adapted to engage the cap, a bar interposed between a portion of the base and the cap normally preventing engagement of the bolt with the cap, means carried by the cap to displace the bar and permit engagement of the bolt with the cap when the cap is fully engaged with the base, and a spring urging the bolt into engagement with the cap.

8. A closure for the fuel tank of a vehicle comprising a base having a spiral groove, a cap having a complementary thread, openings in the cap and base, a bolt mounted in the base and adapted to pass through said openings to lock cap and base together, a slidable bar mounted in the spiral groove and normally blocking passage of the bolt through the openings, and a shoulder on said thread adapted, when the cap is fully screwed down on the base, to displace the bar to permit passage of the bolt through the openings.

In testimony whereof I affix my signature.

LOUIS R. SMITH.